US006657213B2

(12) United States Patent
Orsini et al.

(10) Patent No.: US 6,657,213 B2
(45) Date of Patent: Dec. 2, 2003

(54) HIGH TEMPERATURE EUV SOURCE NOZZLE

(75) Inventors: Rocco A. Orsini, Long Beach, CA (US); Michael B. Petach, Redondo Beach, CA (US); Roy D. McGregor, El Camino Village, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 204 days.

(21) Appl. No.: 09/848,677

(22) Filed: May 3, 2001

(65) Prior Publication Data

US 2002/0162974 A1 Nov. 7, 2002

(51) Int. Cl.[7] .................................................. G01J 1/00
(52) U.S. Cl. .................................................. 250/504 R
(58) Field of Search .......................... 250/504 R, 492.2, 250/493.1; 315/111.21; 378/119; 359/329; 372/104; 430/311, 322

(56) References Cited

U.S. PATENT DOCUMENTS 5,577,092 A 11/1996 Kublak et al.
6,007,963 A 12/1999 Felter et al.
6,065,203 A * 5/2000 Haas et al. .................. 29/505
6,190,835 B1 * 2/2001 Haas et al. ................ 430/311

* cited by examiner

*Primary Examiner*—Kiet T. Nguyen
(74) *Attorney, Agent, or Firm*—John A. Miller; Warn, Burgess & Hoffmann, P.C.

(57) ABSTRACT

A nozzle (46) for a laser-plasma EUV radiation source that provides thermal isolation between the nozzle body (48) and the target material flowing therethrough. A target delivery tube (72) is provided that extends through the nozzle body (48). The delivery tube (72) has an expansion aperture (80) positioned behind an exit collimator (50) of the nozzle body (48). The delivery tube (72) is made of a low thermal conductivity material, such as stainless steel, and is in limited contact with the nozzle body (48) so that heating of the nozzle body (48) from the plasma does not heat the liquid target material being delivered through the delivery tube (72). The expansion aperture (80) has a smaller diameter than the exit collimator (50).

11 Claims, 1 Drawing Sheet

HIGH TEMPERATURE EUV SOURCE NOZZLE

BACKGROUND OF THE INVENTION

1. Field of the Invention

This invention relates generally to a nozzle for an extreme ultraviolet (EUV) lithography source and, more particularly, to a nozzle for an EUV source that employs a target delivery tube within the nozzle to thermally isolate the target material from the heat generated by the plasma.

2. Discussion of the Related Art

Microelectronic integrated circuits are typically patterned on a substrate by a photolithography process that is well known to those skilled in the art, where the circuit elements are defined by a light beam propagating through a mask. As the state of the art of the photolithography process and integrated circuit architecture becomes more developed, the circuit elements become smaller and more closely spaced together. As the circuit elements become smaller, it is necessary to employ photolithography light sources that generate light beams having shorter wavelengths and higher frequencies. In other words, the resolution of the photolithography process increases as the wavelength of the light source decreases to allow smaller integrated circuit elements to be defined. The current state of the art for photolithography light sources generate light in the extreme ultraviolet (EUV) or soft X-ray wavelengths (13.4 nm).

Different devices are known in the art to generate EUV radiation. One of the most popular EUV radiation sources is a laser-plasma, gas condensation source that uses a gas, typically Xenon, as a laser plasma target material. Other gases, such as Krypton, and combinations of gases, are also known for the laser target material. The gas is forced through a nozzle, and as the gas expands, it condenses and converts to a liquid spray. The liquid spray is illuminated by a high-power laser beam, typically from an Nd:YAG laser, that heats the liquid droplets to produce a high temperature plasma which radiates the EUV radiation. U.S. Pat. No. 5,577,092 issued to Kubiak discloses an EUV radiation source of this type.

FIG. 1 is a plan view of a known EUV radiation source 10 including a nozzle 12 and a laser beam source 14. A gas 16 flows through a neck portion 18 of the nozzle 12 from a gas source (not shown). The gas 16 is accelerated through a narrowed throat portion and is expelled through an exit collimator of the nozzle 12 as a jet spray 26 of liquid droplets. A laser beam 30 from the source 14 is focused by focusing optics 32 on the liquid droplets. The energy of the laser beam 30 generates a plasma 34 that radiates EUV radiation 36. The nozzle 12 is designed so that it will stand up to the heat and rigors of the plasma generation process. The EUV radiation 36 is collected by collector optics 38 and is directed to the circuit (not shown) being patterned. The collector optics 38 can have any suitable shape for the purposes of collecting and directing the radiation 36. In this design, the laser beam 30 propagates through an opening 40 in the collector optics 38.

It has been shown to be difficult to produce a spray having large enough droplets of liquid to achieve the desired efficiency of conversion of the laser radiation to the EUV radiation. Because the liquid droplets have too small a diameter, and thus not enough mass, the laser beam 30 causes some of the droplets to break-up before they are heated to a sufficient temperature to generate the EUV radiation 36. Maximum diameters of droplets generated by a gas condensation EUV source is on the order of 0.33 microns. However, droplet sizes of about 1 micron in diameter would be desirable for generating the EUV radiation. Additionally, the large degree of expansion required to maximize the condensation process produces a diffuse jet of liquid, and is inconsistent with the optical requirement of a small plasma size.

To overcome the problem of having sufficiently large enough liquid droplets as the plasma target, U.S. Pat. No. 6,324,256, issued Nov. 27, 2001, titled "Liquid Sprays as the Target for a Laser-Plasma Extreme Ultraviolet Light Source," discloses a laser-plasma, extreme ultraviolet light source for a photolithography system that employs a liquid spray as a target material for generating the laser plasma. In this design, the EUV source forces a liquid, preferably Xenon, through the nozzle, instead of forcing a gas through the nozzle. The geometry of the nozzle and the pressure of the liquid propagating through the nozzle, atomize the liquid to form a dense spray of liquid droplets. Because the droplets are formed from a liquid, they are larger in size, and are more conducive to generating the EUV radiation.

Another problem exists in the known EUV sources that causes some of the liquid target material to vaporize prior to being energized by the laser. The plasma generation area is typically about 2 mm away from the nozzle exit, and is generating heat at about 200,000° K. Because the EUV radiation source nozzle is positioned so close to the plasma generation area, the heat from the plasma heats the nozzle and thus the target material therein. The nozzles are typically subjected to thermal inputs up to 10 kW/cm2. Warming the target material at the expansion aperture of the nozzle leads to reduced target production and to the formation of EUV absorbing vapors. Particularly, heating of the nozzle to such high temperatures causes some of the liquid target material to vaporize reducing the liquid density of the target. Further, particles from the plasma generation process cause a sputtering effect on the nozzle which adversely affects the EUV generation. It is known in the art to make the nozzle out of graphite to reduce the sputtering effects, although other materials may be used for better erosion resistance. However, graphite is a good thermal conductor which enhances heating of the cold target material within the nozzle.

What is needed is a nozzle for a laser-plasma EUV radiation source that provides thermal isolation between the nozzle body and the target material traveling therethrough to enhance the EUV radiation generation. It is therefore an object of the present invention to provide such an EUV radiation source nozzle.

SUMMARY OF THE INVENTION

In accordance with the teachings of the present invention, a nozzle for a laser-plasma EUV radiation source is disclosed that provides thermal isolation between the nozzle body and the target material flowing therethrough. A separate target material delivery tube protrudes through the nozzle body with limited tube/nozzle surface contact such that proper tube/nozzle alignment is achieved while providing thermal isolation. In one embodiment, the delivery tube is made of a material having low thermal conductivity, such as stainless steel, so that heating of the nozzle body from the plasma does not heat the liquid target material being delivered through the delivery tube. The delivery tube has an expansion aperture positioned behind an exit collimator of the nozzle body. The expansion aperture has a smaller diameter than the known exit collimators to deliver less material to the plasma generation area.

Additional objects, advantages and features of the present invention will become apparent to those skilled in the art from the following discussion and the accompanying drawings and claims.

DETAILED DESCRIPTION OF THE PREFERRED EMBODIMENTS

The following discussion of the preferred embodiments directed to a nozzle for an EUV radiation source is merely exemplary in nature, and is in no way intended to limit the invention or its applications or uses.

Figure 1:
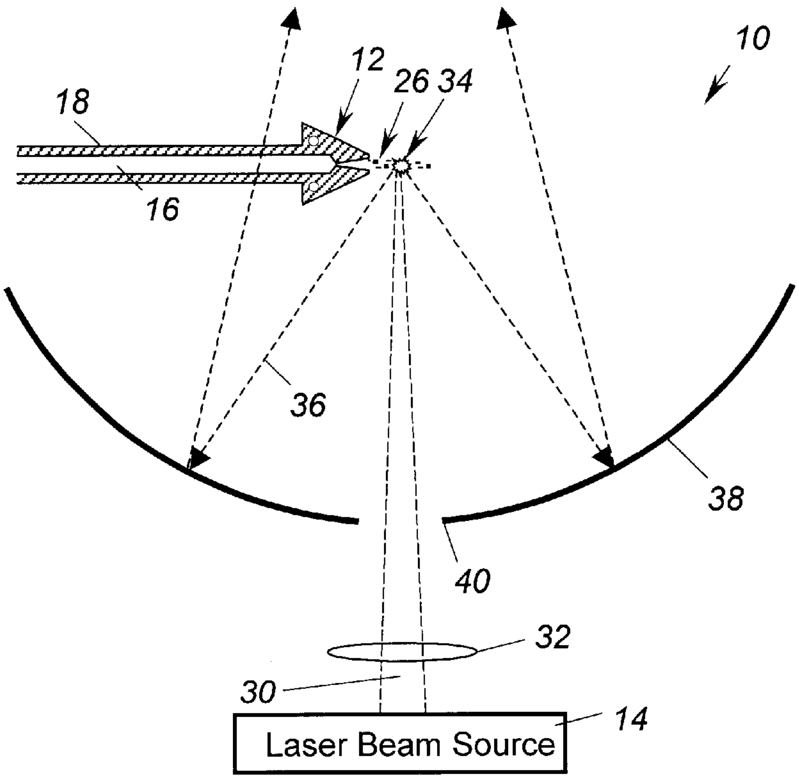
Figure 1 (Prior Art)
FIG. 1 is a plan view of a known laser-plasma, gas condensation, extreme ultraviolet light source.
Figure 2:
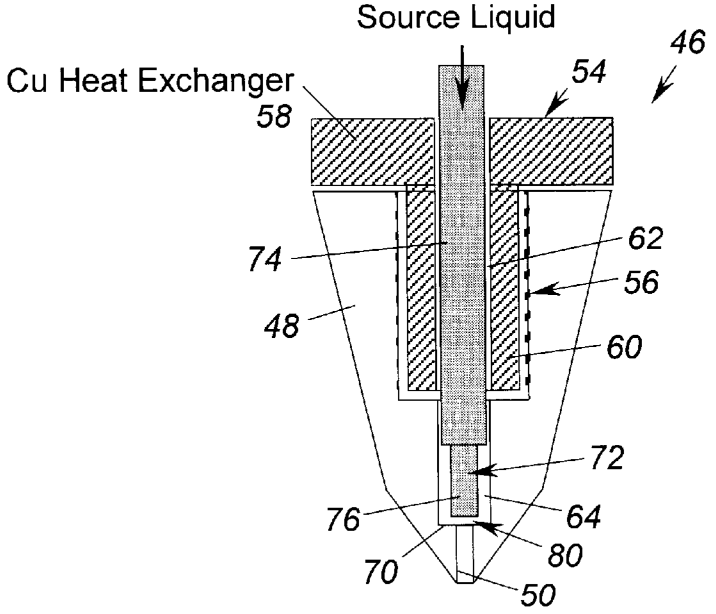
FIG. 2 is a cross-sectional view of a nozzle for a laser-plasma, extreme ultraviolet radiation source employing a target material delivery tube, according to an embodiment of the present invention.

FIG. 2 is a cross-sectional view of a nozzle 46 for an EUV source, according to the invention, and is applicable to replace the known nozzle 12 discussed above. The nozzle 46 includes a graphite body portion 48 having a size and shape suitable for the purposes described herein. The nozzle 46 includes a cylindrical exit collimator 50 through which the liquid target material exits the nozzle 46 under suitable pressure. The collimator 50 collimates the liquid spray so that it is directed towards the plasma generation area. A heat exchanger 54 is threaded into a threaded opening 56 in the body portion 48. The heat exchanger 54 includes a base portion 58 and stem portion 60 that is threaded within the threaded opening 56. The heat exchanger 54 provides cooling for the body portion 48, and further provides support for the nozzle 46. A bore 62 extends through the heat exchanger 54, and is in communication with a narrowed bore 64 in the body portion 48. The bore 64 is in fluid communication with the exit collimator 50, and forms a shoulder 70 therebetween.

In the known nozzles for EUV sources, the target material would flow through the bores 62 and 64 and exit the nozzle 46 through the collimator 50. However, heating of the graphite body portion 48 from the plasma generation would affect the liquid target within the body portion 48, causing some vaporization and target loss. According to the present invention, an elongated target material delivery tube 72 extends through the bores 62 and 64 and abuts against the shoulder 70, as shown. The tube 72 includes a wide portion 74 and a narrow end portion 76. The tube 72 is positioned to provide a gap between the delivery tube 72 and the heat exchanger 54, and a gap between the delivery tube 72 and the internal walls of the body portion 48 within the bore 64. The delivery tube 72 includes an expansion orifice 80, or an array of orifices, at the end of the narrowed portion 76 so that the orifice 80 is positioned proximate to the shoulder 70.

The liquid target material is delivered from a suitable target source (not shown) through the delivery tube 72 and enters the exit collimator 50 under pressure. The delivery tube 72 provides thermal isolation from the heated graphite body portion 48 during plasma generation. Additionally, the gap between the delivery tube 72 and the body portion 48 is at low pressure because the process occurs under vacuum pressure, and serves to further insulate the cold target material within the delivery tube 72 from the heated body portion 48. The cold liquid target material is delivered at the desired operating pressure and temperature to the collimator 50 across which it undergoes supersonic expansion to yield particles of either solid or liquid target material. The diameter of the orifice 80 can be about 50 microns in one embodiment so that it provides the desirable size liquid droplets. Additionally, the delivery tube 72 provides structural integrity to the nozzle 46 so that the size of the body portion 48 can be minimized.

In one embodiment, the delivery tube 72 is made of a suitable stainless steel. However, this is the way of a non-limiting example in that other materials can be used, preferably thermally non-conductive materials, such as nickel and ceramic. Although it is desirable that the delivery tube 72 be made of a thermally non-conductive material, because of the gap, the contact area between the tubes 72 and the body portion 48 is minimal so that even thermally conductive delivery tubes will provide a reduced heating of the cold target material.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A nozzle for a laser-plasma extreme ultraviolet (EUV) radiation source, said nozzle comprising:

a nozzle body having a source end, an exit end, and a channel therebetween, said source end receiving a target material and said exit end emitting the target material; and a target material delivery tube extending through the channel, wherein an inner surface of the nozzle body within the channel is spaced from an outer surface of the target delivery tube to form a gap, said delivery tube including a first end positioned proximate the source end of the nozzle body and a second end positioned proximate and within the exit end of the nozzle body, said first end receiving the target material and said second end emitting the target material into the exit end of the nozzle body, said target material traveling a distance through the nozzle body before being emitted therefrom.

2. A nozzle for a laser-plasma extreme ultraviolet (EUV) radiation source, said nozzle comprising:

a nozzle body having a source end, an exit end, and a channel therebetween, said source end receiving a target material and said exit end emitting the target material, the exit end of the nozzle body including a collimator portion that collimates the target material as it exits the nozzle body; and a target material delivery tube extending through the channel, wherein an inner surface of the nozzle body within the channel is spaced from an outer surface of the target delivery tube to form a gag, said delivery tube including a first end positioned proximate the source end of the nozzle body and a second end positioned proximate and within the exit end of the nozzle body, said first end receiving the target material and said second end emitting the target material into the collimator portion of the nozzle body.

3. A nozzle for a laser-plasma extreme ultraviolet (EUV) radiation source, said nozzle comprising:

a nozzle body having a source end, an exit end, and a channel therebetween, said source end receiving a target material and said exit end emitting the target material, the exit end of the nozzle body including a collimator portion that collimates the target material as it exits the nozzle body; and a target material delivery tube extending through the channel, wherein an inner surface of the nozzle body within the channel is spaced from an outer surface of the target delivery tube to form a gap, said delivery tube including a first end positioned proximate the source end of the nozzle body and a second end positioned proximate and within the exit end of the nozzle body abutting against a shoulder formed between the collimator portion and a wider portion of the channel, said first end receiving the target material and said second end emitting the target material into the collimator portion of the nozzle body.

4. A nozzle for a laser-plasma extreme ultraviolet (EUV) radiation source, said nozzle comprising:

a nozzle body having a source end, an exit end, and a channel therebetween, said source end receiving a target material and said exit end emitting the target material; and a target material delivery tube extending through the channel, wherein an inner surface of the nozzle body within the channel is spaced from an outer surface of the target delivery tube to form a gap, said delivery tube being made of a material selected from the group consists of a low thermal conductivity material, graphite, and a refractory material, said delivery tube including a first end positioned proximate the source end of the nozzle body and a second end positioned proximate and within the exit end of the nozzle body, said first end receiving the target material and said second end emitting the target material into the exit end of the nozzle body, said target material traveling a distance through the nozzle body before being emitted therefrom.

5. The nozzle according to claim 4 wherein the delivery tube is made of a stainless steel.

6. A nozzle for a laser-plasma extreme ultraviolet (EUV) radiation source, said nozzle comprising:

a nozzle body having a source end, an exit end, and a channel therebetween, said source end receiving a liquid target material and said exit end emitting a spray of solid particles target material; and a target material delivery tube extending through the channel, wherein an inner surface of the nozzle body within the channel is spaced from an outer surface of the target delivery tube to form a gap, said delivery tube including a first end positioned proximate the source end of the nozzle body and a second end positioned proximate and within the exit end of the nozzle body, said first end receiving the target material and said second end emitting the target material through the exit end of the nozzle body, said target material traveling a distance through the nozzle body before being emitted therefrom.

7. A nozzle for a laser-plasma extreme ultraviolet (EUV) radiation source, said nozzle comprising:

a nozzle body having a source end, an exit end, and a channel therebetween, said source end receiving a liquid target material and said exit end emitting the liquid droplet target material; and a target material delivery tube extending through the channel, wherein an inner surface of the nozzle body within the channel is spaced from an outer surface of the target delivery tube to form a gap, said delivery tube including a first end positioned proximate the source end of the nozzle body and a second end positioned proximate and within the exit end of the nozzle body, said first end receiving the target material and said second end emitting the target material into the exit end of the nozzle body, said target material traveling a distance through the nozzle body before being emitted therefrom.

8. A nozzle for a laser-plasma extreme ultraviolet (EUV) radiation source, said nozzle comprising:

a nozzle body having a source end, an exit end and a bore extending therebetween, said exit end having a collimator portion, said source end receiving a liquid target material and said exit end emitting the liquid target material as a spray of liquid droplets; and a target material delivery tube extending through the bore so that a gap is provided between an inner surface of the nozzle body within the bore and an outer surface of the delivery tube so that the delivery tube is not in direct contact with the nozzle body, said delivery tube including a first end positioned proximate the source end of the nozzle and a second end positioned proximate the collimator portion, said first end receiving the liquid target material and said second end emitting said target material into the collimator portion.

9. A nozzle for a laser-plasma extreme ultraviolet (EUV) radiation source, said nozzle comprising:

a nozzle body having a source end, an exit end and a bore extending there between, said exit end having a collimator portion, said source end receiving a liquid target material and said exit end emitting the liquid target material as a spray of liquid droplets; and a target material delivery tube extending through the bore so that a gap is provided between an inner surface of the nozzle body within the bore and an outer surface of the delivery tube so that the delivery tube is not in direct contact with the nozzle body, said delivery tube being made of a material selected from the group consisting of a low thermal conductivity material, stainless steel, graphite, and a refractory material, said delivery tube including a first end positioned proximate the source end of the nozzle and a second end positioned proximate the collimator portion, said first end receiving the liquid target material and said second end emitting said target material into the collimator portion.

10. The nozzle according to claim 9 wherein the second end of the delivery tube abuts against a shoulder formed between the collimator portion and a wider portion of the channel.

11. A method of generating extreme ultraviolet (EUV) radiation, said method comprising the steps of:

providing a nozzle body having a source end, an exit end and a channel extending therebetween;

positioning a target delivery tube in the channel, wherein a gap is defined between an inner surface of the nozzle body in the channel and an outer surface of the target delivery tube;

applying a target material under pressure to a first end of the delivery tube; and emitting the target material from a second end of the delivery tube into a collimator portion of the channel to be shaped and emitted from the nozzle through the exit end.

* * * * *

UNITED STATES PATENT AND TRADEMARK OFFICE

CERTIFICATE OF CORRECTION

PATENT NO. : 6,657,213 B2
DATED : December 2, 2003
INVENTOR(S) : Orsini et al.

It is certified that error appears in the above-identified patent and that said Letters Patent is hereby corrected as shown below:

Column 4,
Line 53, "gag" should be -- gap --.

Signed and Sealed this

Twentieth Day of December, 2005

JON W. DUDAS
*Director of the United States Patent and Trademark Office*